(12) United States Patent
Chiang et al.

(10) Patent No.: US 10,778,813 B2
(45) Date of Patent: Sep. 15, 2020

(54) MOBILE VOICE ADAPTIVE CONTROL PROTOCOL WITH METHOD FOR RETRANSMISSION

(71) Applicant: T-Mobile USA, Inc., Bellevue, WA (US)

(72) Inventors: Hsin-Fu Henry Chiang, Bellevue, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/051,679

(22) Filed: Aug. 1, 2018

(65) Prior Publication Data
US 2020/0045147 A1    Feb. 6, 2020

(51) Int. Cl.
| | |
|---|---|
| *H04L 29/06* | (2006.01) |
| *H04L 12/24* | (2006.01) |
| *H04W 24/02* | (2009.01) |
| *H04L 12/26* | (2006.01) |

(52) U.S. Cl.
CPC ........ *H04L 69/165* (2013.01); *H04L 41/0836* (2013.01); *H04L 43/08* (2013.01); *H04L 43/16* (2013.01); *H04W 24/02* (2013.01)

(58) Field of Classification Search
CPC ....... H04L 69/165; H04L 43/08; H04L 43/16; H04L 41/0836; H04W 24/02
See application file for complete search history.

(56) References Cited

U.S. PATENT DOCUMENTS

| | | | |
|---|---|---|---|
| 6,771,594 B1* | 8/2004 | Upadrasta | H04L 29/06027 370/228 |
| 9,912,600 B1* | 3/2018 | Attarwala | H04L 47/365 |
| 2008/0049638 A1* | 2/2008 | Ray | H04L 41/0896 370/252 |
| 2013/0114481 A1* | 5/2013 | Kim | G06F 15/16 370/310 |
| 2014/0269289 A1* | 9/2014 | Effros | H04L 47/38 370/231 |
| 2018/0198723 A1* | 7/2018 | Attarwala | H04L 43/50 |
| 2019/0052572 A1* | 2/2019 | Naik | H04W 76/12 |

* cited by examiner

*Primary Examiner* — Dady Chery
(74) *Attorney, Agent, or Firm* — Lee & Hayes, P.C.

(57) ABSTRACT

Systems and methods for providing improved connection setup on networks is disclosed. At initial call setup, the system can choose between transmission control protocol (TCP) and user datagram protocol (UDP) based on current network conditions. When network conditions—e.g., signal strength and/or signal quality—are such that establishing the connection is likely to be unreliable, then the system can automatically choose TCP for improved reliability. When network conditions are good, on the other hand, then the system can automatically choose UDP for improved speed and efficiency. The system may also switch back and forth between TCP and UDP during use because of changing network conditions. This can reduce dropped connections, poor quality connections, dropped packets, and other errors.

20 Claims, 6 Drawing Sheets

MOBILE VOICE ADAPTIVE CONTROL PROTOCOL WITH METHOD FOR RETRANSMISSION

BACKGROUND

The proliferation of wireless devices that use cellular and/or Wi-Fi frequencies for cellular data and voice services has placed increased demand on cellular networks. Users check e-mail, surf the Internet, download movies, and perform other tasks on cell phones, tablet computers, laptops, and other devices (collectively, user equipment, or "UEs"). The sheer number of devices connected to a network at the same time presents significant challenges.

One of these challenges is to route UEs quickly and accurately to a requested resource or destination (e.g., a phone number, IP address, etc.). When a user enters a phone number and hits send, for example, it is desirable for the call to be connected quickly—generally in a matter of seconds. Of course, connecting the phone call accurately is equally important—i.e., connecting the user quickly, but to the wrong phone number, is of little use.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
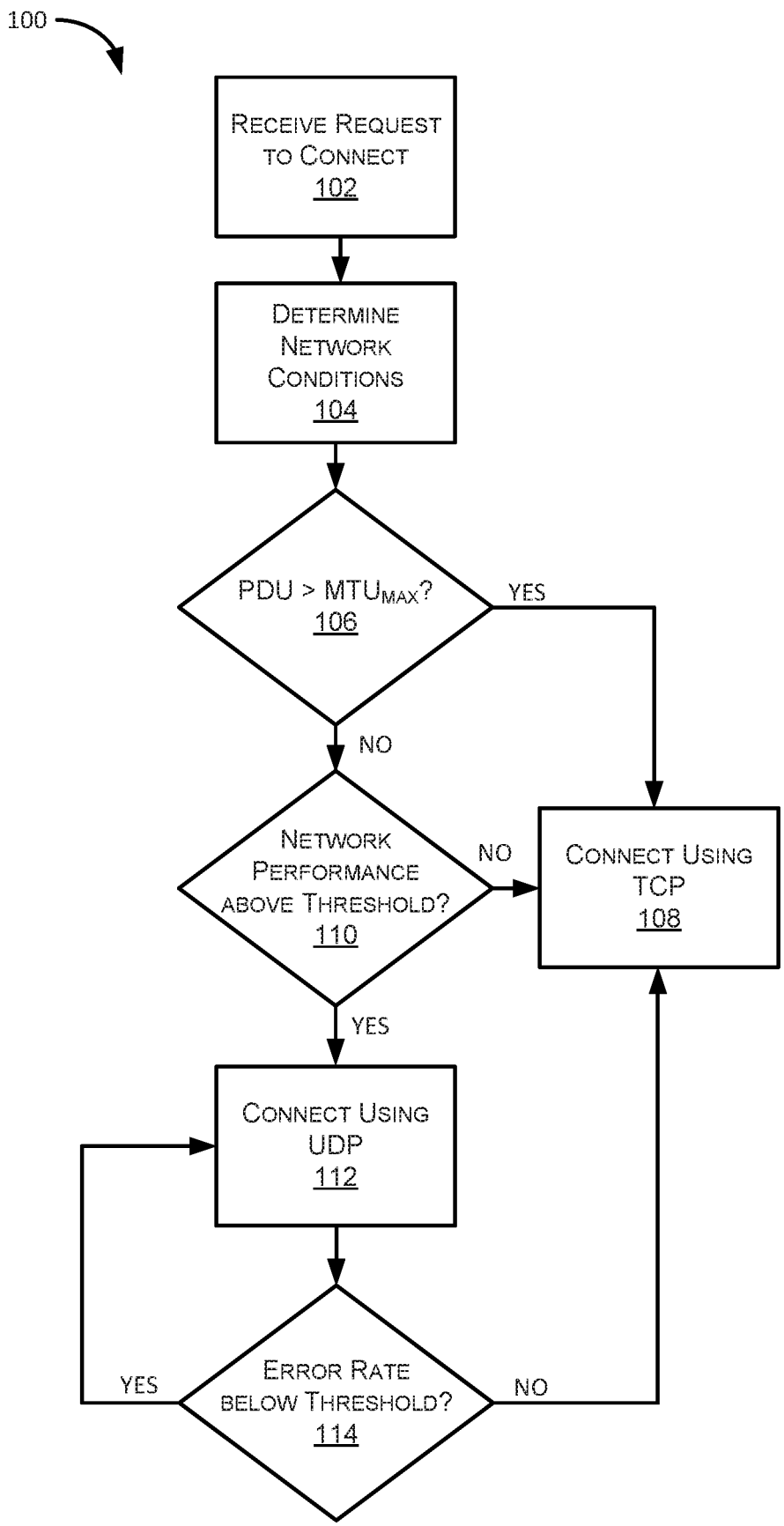
FIG. 1 is a flowchart depicting an example of a method for switching between user datagram protocol (UDP) and transmission control protocol (TCP) signaling as network conditions change, in accordance with some examples of the present disclosure.

Examples of the present disclosure relate to systems and methods for improved network performance. The system provides mechanisms to determine whether a connection is to be established using transmission control protocol (TCP) or user datagram protocol (UDP). The system can make this determination based on various network conditions such as, for example, signal strength and/or signal quality. When these conditions are above predetermined thresholds (e.g., signal strength and/or quality are high), the system can use UDP for appropriate applications to reduce signaling overhead and improved speed and efficiency. When these conditions are below predetermined thresholds (e.g., signal strength and/or quality are low), the system can use TCP for appropriate applications to improve reliability and reduce errors and delays.

The system is described below for use with various call applications such as, for example, voice over internet protocol (VOIP), video calling, and real-time text (RTT) calls. One of skill in the art will recognize, however, that the systems and methods disclosed herein could also be used for other applications that might otherwise be limited to UDP, regardless of network conditions. These applications can include, for example, online games, live video broadcasts, stock tickers, and other applications where data is almost immediately replaced with new data and lost data packets are generally of little consequence.

Both TCP and UDP are protocols used for sending packets of data over internet protocol (IP) networks (e.g., the Internet) and were both built for use with the internet protocol. When sending a packet of data using either TCP or UDP, therefore, the packet is sent to an IP address. These packets can be sent and received in conjunction with internet browsers, e-mail applications, VOIP, video, and RTT calls, and other applications. These packets are treated similarly and are forwarded from a sending device to intermediary servers and routers and then to a destination device.

These devices can be, for example, desktop and laptop computers, tablets, cellular phones, smart watches, among other things. To simplify and clarify explanation, these devices are collectively referred to herein as user equipment, or UE. And, while UE are described below with respect to fourth generation long-term evolution (4G LTE) networks, for example, one of skill in the art will recognize that the systems and methods described herein are equally applicable to other types of networks, such as fifth generation (5G) networks, internet of things (IoT), and even future networks that have yet to be deployed. Thus, the use of terms like UE, 4G LTE, and the like are meant only to simplify and clarify explanation, and not to limit the disclosure.

TCP is one of the most commonly used protocols on IP networks, such as the Internet. To load a web page, for example, a UE sends TCP packets to the IP address of a server (e.g., a "web server") requesting the web page. The web server responds by sending a stream of TCP packets, which can then be stitched together by a web browser on the UE to form the web page and display it. When a user performs actions on the UE (e.g., clicks on a link, signs in to an application or server, or posts a comment) the web browser sends TCP packets back to the server and the server returns TCP packets.

In addition, during these interchanges, the UE and the web server are also exchanging packets to indicate when each has received a packet. Thus, TCP guarantees the UE will receive the packets from the web server, in this case by numbering them and sending them in order. The UE sends an acknowledgement message to web server as each packet is received. If the web server does not receive this acknowledgement, the web server will stop and resend the missing, or "dropped," packets to ensure the UE receives them.

In TCP, packets are also checked for errors using error detection methods (e.g., checksums). This enables packets sent with TCP to be tracked to ensure that all packets are received in order and also that no data is lost or corrupted in transit. This enables files, even large files, to be downloaded effectively despite any potential network performance issues during the download.

The UDP protocol is similar to TCP, but does not use the same level of error checking and, in some cases, uses no error checking at all. In addition, UDP does not require all of the packets to be received in order or for all packets to be received at all. Using UDP, the web server (in the example above) simply sends the packets to the UE. The sender will not wait to make sure the recipient received the packet—it will just continue sending the next packets. If the recipient UE misses some UDP packets, the UE cannot request retransmission of those packets. As a result, there is no guarantee that the UE will get all of the packets. UDP does have the advantage, however, of losing the overhead associated with the ordered delivery, retransmission, error checking, etc. used in TCP. Thus, UDP enables more efficient, although perhaps less complete or high fidelity, communication between UEs.

As a result, UDP is often used when speed is desirable and error correction is not necessary. UDP is often used for live broadcasts and online games, for example, where a couple of missing frames will quickly be replaced with new frames. Similarly, UDP is generally used for voice calls where dropped packets may be not even be noticed—i.e., either because the drop-out is so short the user does not perceive it, for example, or the associated codec fills in the drop-outs with a filling algorithm. Even if the drop-out is significant, the recipient can merely ask the speaker to repeat what they said—"You dropped out there, what was that?"

A problem arises, however, when network conditions are such that even a voice call cannot be properly routed or transmitted. If it takes more than a few seconds for a call to connect, for example, the user may simply hang up thinking the call did not go through. The user may then retry the call, further burdening the network. Similarly, if the network conditions are such that the call can be connected, but the quality of the call is substantially degraded, then the user may also hang up and retry the call.

Example 1

For this example, a theoretical 4G LTE network has a suggested 4G LTE minimal signal strength for attachment of −110 decibel milliwatts (dBm) reference signal received power (RSRP) and a minimum RSRP to stay connected of −124 dBm. Thus, a UE connects to the 4G LTE network at this initial minimum −110 dBm RSRP. During use, however, the RSRP (as measured by the UE or the network) drops to −116 dBm. Since the RSRP is still higher (less negative) than the −124 dBm connection strength, the UE stays connected to the 4G LTE network.

In this example, a conventional UE trying to place a voice call, for example, would attempt to place the call using UDP, despite the unfavorable RSRP. Thus, there may be a delay in call setup or even a complete failure, and the user may reattempt the call or give up altogether. In contrast, the systems and methods described herein cause the UE to use TCP for any non-access stratus (NAS) signaling for voice connections (including video calls, real-time text calls, and emergency calls) and bearer setup regardless the NAS message size—i.e., even messages that are small enough that they would normally use UDP use TCP. Indeed, the UE must use TCP regardless of the SIP message type (e.g., REGISTER, INVITE, UPDATE, SIP 183/180/200 response, etc.) or size.

This improves the internet protocol multimedia subsystem (IMS) voice over LTE delay during call setup signaling due to poor RF conditions. In addition, this enables the re-transmission to happen at the network (e.g., at the transport layer) instead of at the UE or the application level. In addition, per the third-generation partnership program (3GPP), SIP application layer re-transmission also provides an incremental (2 s, 4 s, 8 s, 16 s, ... 128 s) timer (Timer A) to prevent unwanted/unnecessary signaling.

Unfortunately, there is currently no such protocol in place to enable services that use UDP by default to "fallback" to using TCP for improved reliability when network conditions are poor. Indeed, there is no mechanism in place to check current network conditions prior to, for example, connecting a voice call or starting a video stream. It would be useful for services that use UDP by default to have systems and methods that check current network conditions (1) when a service is requested and/or (2) during use and then fall back from UDP to TCP when network conditions are below a predetermined threshold. It is to such systems and methods that examples of the present disclosure are primarily directed.

As shown in FIG. 1, examples of the present disclosure can comprise a method 100 for determining whether to connect to a network using UDP or TCP based on, among other things, network conditions. The method 100 can enable UEs to automatically connect to the network using TCP, even when the requested service would normally connect using UDP. The method 100 can enable improved setup times, for example, to avoid the overhead associated with users hanging up and retrying calls due to delays in call setup, call failures, poor transmission quality, etc.

At 102, the network (e.g., a 4G LTE, 5G network, etc.) can receive a request from a UE to connect to a particular service that generally uses UDP. The UE may be attempting to place a voice call, for example, or connecting to a video streaming service. The request can be received by a network entity such as, for example, a proxy call session control function (P-CSCF) or a serving call session control function (S-CSCF), discussed below with respect to FIG. 4, which can then route the UE to one or more telephony application servers (TASs), as applicable.

At 104, the network or the UE can determine the current network conditions for the UE. In other words, as discussed below, the system can monitor network conditions from the network side (e.g., at the cellular wireless base station (WBS) or P-CSCF) or the UE can monitor network conditions from the UE side. At the network level, the network can monitor, for example, current network latency, bandwidth, etc. This can also include monitoring conditions at the cell or UE level. So, for example, the network or the UE can determine the current signal strength (either from the WBS or the UE) and/or the signal quality to determine whether the network should use UDP or TCP to connect the UE.

A variety of metrics can be used to monitor, for example, signal strength and/or signal quality. With respect to signal strength, the system can monitor, for example, a received signal strength indicator (RSSI) and/or RSRP. RSSI is generally used when referring to, for example, third-generation (3G), code division multiple access (CDMA), universal mobile telecommunications systems (UMTS), and Wi-Fi communications systems. RSRP, on the other hand, is generally used in reference to 4G LTE and 5G communications systems. RSRP is generally measured in dBm and, in the case of cellular communications, is generally negative, with a less negative number indicating a stronger signal (i.e., the closer to zero, the stronger the signal).

In other examples, the network or the UE can monitor signal quality instead of, or in addition to, signal strength. The system can monitor, for example, energy to interference ratio or energy per chip to interference power ratio (ECIO), which is generally used in reference to, for example, 3G, CDMA, and UMTS. For 4G LTE and 5G systems, on the other hand, signal quality can be monitored using reference signal received quality (RSRQ) or signal to interference plus noise ratio (SINR), among other methods.

Because different UE include different equipment (e.g., antennas, amplifiers, chipsets, etc.), there is generally not a set level at which all UE will perform satisfactorily. To this end, in some examples, the system may include different RSRPs, for example, based on the UE, the WBS, atmospheric conditions, etc. For newer WBS and UE, for example, with state-of-the-art antennas, receivers, etc., for example, the minimum RSRP may be lower (more negative) than for comparatively older WBSs and/or UE. In other examples, the system may assume a minimum signal strength at which most, or all, UEs should perform adequately, an average signal strength, etc. In still other examples, the system can include a "closed-loop" feedback mechanism, in which the network and/or the UE monitor data regarding signal strength, signal quality, packet loss, etc. to enable the system to change minimum network requirements in real time as conditions change.

Regardless of the metric(s) used, at 106, the system can determine if the current protocol data unit (PDU) exceeds the maximum transmission unit (MTU). A PDU is the information that is transmitted as a single unit between entities of a computer network and may contain user data or control information and network addressing—e.g., an IP address or phone number to initiate a voice call. The maximum transmission unit (MTU) is the size of the largest protocol data unit (PDU) that can be communicated in a single network layer transaction.

If the current PDU exceeds the MTU, then at 108 the system can automatically initiate the communication using TCP. Since more than one "frame" is required to initiate the communication, TCP can enable multiple frames to be sent in order, with error checking and confirmation, to ensure the connection is properly routed and received.

If the current PDU does not exceed the MTU, then for many applications (e.g., voice calls, video simulcast, etc.) the system would conventionally automatically select UDP without concern for current network conditions. As mentioned above, conventional thinking is that, for a voice call for example, the users will simply tell each other to repeat themselves if necessary for any lost packets. Similarly, lost packets for a live broadcast will be quickly replaced with new packets from the same broadcast. Of course, this thinking does not take into account the user's experience, which may include digitized or garbled speech, video pixilation and freezing, etc.

In contrast, the system disclosed herein can first determine whether network conditions (e.g., signal strength, signal quality, etc.) are good enough to provide reliable communications. To this end, at 110, the system can determine if the network performance is above a predetermined threshold. In some examples, the predetermined threshold can include a threshold level for each metric separately— e.g., both the RSRP and the RSRQ must be above a set amount. In other examples, the threshold can be determined based on a combination of metrics—e.g., a low RSRP can be compensated for by a high RSRQ, and vice-versa. So, the RSRP threshold can be −116 dBm, for example, and the RSRQ can be above −10 dB (or some other suitbale values).

Regardless of the actual metric used, if the network performance is above the threshold, then at 112 the UE can connect using UDP. This improves network performance due to the reduced overhead discussed above with respect to error checking and verification. Importantly, however, even without the error checking associated with TCP, the system nonetheless improves the user experience by ensuring that the network conditions are such that fewer errors will occur anyway. In other words, if signal strength, signal quality, and other metrics are above the threshold, then transmission errors, packet loss, and other issues are largely avoided— even when using UDP.

In some examples, the method 100 can also include an error checking algorithm. At 114, therefore, the method 100 can determine if the error rate using UDP is below an acceptable threshold. The threshold can be different for different applications and services, different UEs, different codecs, etc. Some voice codecs, for example, include automatic filling algorithms to replace dropped packets based on the packets received before and after the dropped packet. These codecs can then "fill in the blanks" based on the rise and fall of adjacent packets, for example, or other factors. Similarly, the acceptable error rate for live video where the previous frame is being updated at a relatively high rate, for example, may be higher than the acceptable error rate for a stock ticker that is only updated every 30 seconds (and where an error can prove to be very expensive).

If the error rate is determined to be below the error threshold for the service or application in use, then at 112 the method 100 can continue to use the UDP connection for improved performance with reduced overhead. If, on the other hand, the error rate is above the error threshold, then at 108 the method 100 can reconnect the UE to the network using TCP. This can enable the system to account for the error rate, whatever the cause, by employing the retransmission functions inherent in TCP.

In some examples, while not shown, the method 100 can iteratively check the network conditions and error rates and switch back and forth between TCP and UDP as conditions allow. Maximizing the use of UDP, while still managing error rates, can improve network efficiency by reducing the aforementioned overhead. Monitoring error rates, on the other hand, can mitigate issues caused by dropped packets and other errors that might not otherwise be accounted for simply using UDP alone.

Figure 2:
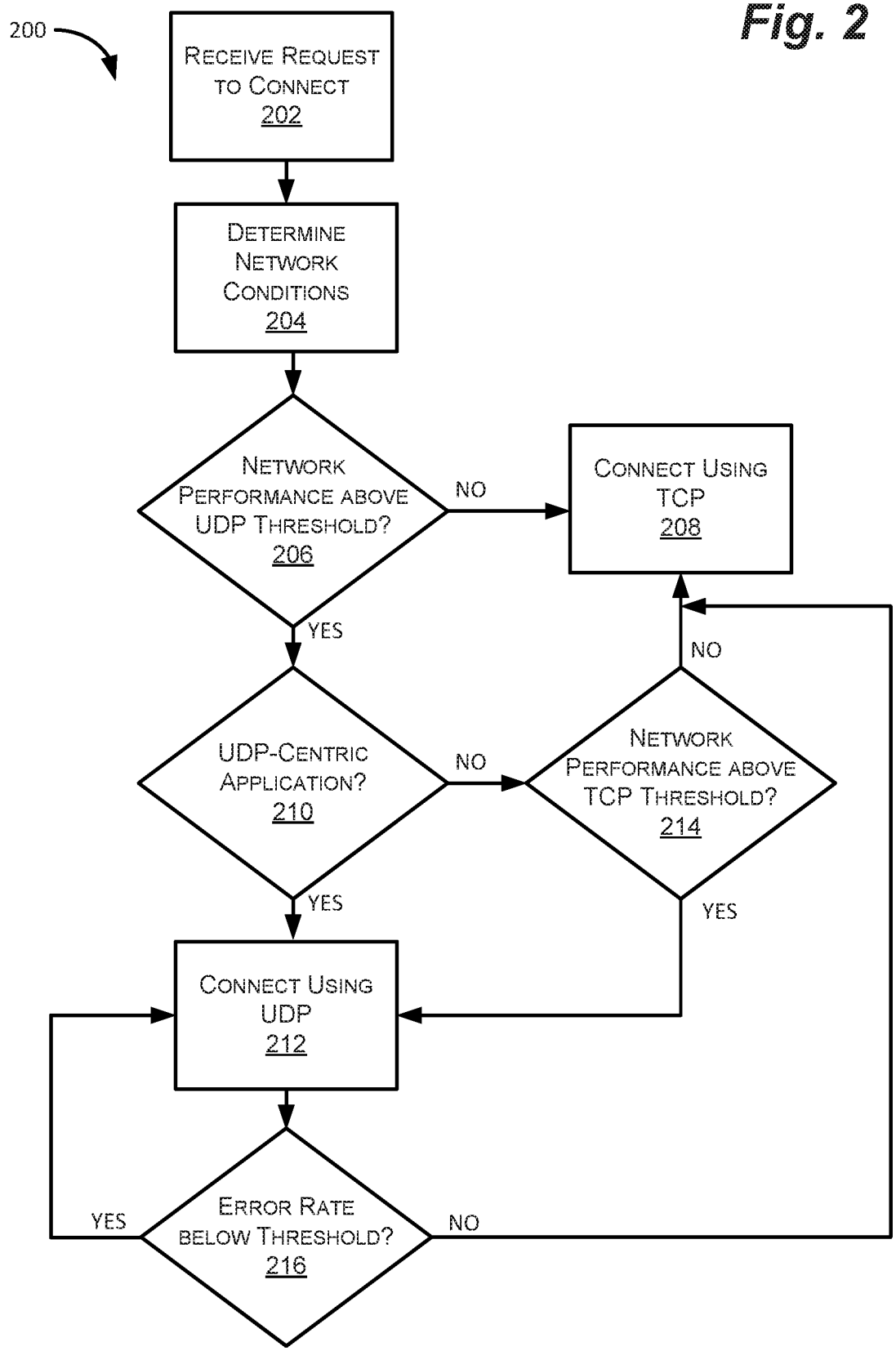
FIG. 2 is a flowchart depicting another example of a method for switching between UDP and TCP signaling as network conditions change, in accordance with some examples of the present disclosure.

In some examples, as shown in FIG. 2, examples of the present disclosure can also comprise a two-tiered method 200 for using UDP—even for those applications that traditionally use TCP. In other words, as mentioned above, some applications (voice calls, videocasts, etc.) typically use UDP for improved performance (e.g., higher speeds, lower latency, etc.), while other applications (e.g., file downloads, updates, etc.) typically use TCP for improved reliability. In some cases, however, network conditions are such that TCP-centric applications can also use UDP with few or no errors. Thus, overall network performance can be improved without affecting network reliability. The method 200 is similar to the method 100 discussed above, but includes two network performance thresholds—a first lower, or UDP, threshold, and a second higher, or TCP, threshold.

At 202, the network can receive a request from a UE to connect to a particular service. In this case, however, the method 200 can determine if UDP can be used regardless of what type of application or service is being requested and regardless of MTU. The UE may be attempting to do anything from placing a voice call, for example, to downloading a large file. As mentioned above, the request can be received by a network entity such as, for example, a P-CSCF or an S-CSCF, which can then route the UE to one or more TASs, as applicable.

At 204, the network or the UE can determine the current network conditions for the UE. The system can monitor network conditions from the network side (e.g., from the WBS or P-CSCF) or the UE can monitor network conditions from the UE side. At the network level, the network can monitor, for example, current network latency, bandwidth, etc. This can also include conditions at the cell or UE level. So, for example, the network or the UE can determine the present signal strength (either from the WBS or from the UE) and/or the signal quality to determine whether the network should use UDP or TCP to connect the UE.

At 206, the method 200 can determine if the current network conditions are above the UDP threshold. As before, the UDP threshold can be adjusted based on many factors. The UDP threshold may be lower (more negative) for newer UEs or WBSs, for example, than older UEs or WBSs due to improved technology. The UDP threshold may also be more negative in favorable weather conditions (e.g., clear and dark) than in less favorable conditions (e.g., raining or bright sunshine). The UDP threshold may also depend on current traffic levels. In other words, more traffic on the network necessarily results in more errors. Thus, as the traffic on the network approaches capacity, the UDP threshold may be raised (made less negative) to reduce errors.

In some examples, as traffic increases and/or other conditions worsen, for example, the UDP threshold may also rely on more than one metric to determine when to switch between UDP and TCP. As the traffic on the network approaches capacity, for example, then at 206 the network can determine if both the RSRP and the RSRQ (or some other combination of metrics) are above a predetermined threshold. So, for example, if the RSRP is between −116 dBm and −110 dBm, for example, and the RSRQ can be between −10 dB and −5 dB (or some other suitable combination), then the method 200 can use UDP. If one, or both, are below these ranges, then the method 200 can use TCP for reliability. Alternatively, if either metric is above these ranges (less negative), then the method 200 may use UDP, for example, sometimes regardless of what value is measured for the other metric.

If network performance is below the UDP threshold, then at 208 the method 200 can connect the UE to the network using TCP. If the UDP threshold for RSRP is −110 dBm, for example, and the current RSRP between the UE and the WBS is −116 dBm, for example, then the method 200 can connect the UE to the network using TCP to avoid delays in call setup, for example, and to avoid errors associated with a comparatively weak connection. As before, in poor conditions, the method 200 can connect the UE to the network using TCP regardless of what type of application or service is being requested.

If the current network conditions are above the UDP threshold, on the other hand, then at 210 the method 200 can next determine if the requested service or application is a "UDP-centric" application—or, an application that would typically use UDP. These applications can vary from provider to provider but can include, for example, voice calls, video calls, RTT calls, video simulcasts, etc. Indeed, even in marginal network conditions, UDP can be used when data is frequently replaced with new data (e.g., streaming video, streaming music, etc.) or where dropped packets do not cause an issue or can be replaced with an appropriate algorithm (e.g., in a voice codec).

If the current application or service that is being requested by the UE is a UDP-centric application, then at 212 the method 200 can connect the UE to the network using UDP. In this case, the network conditions are good enough to connect UDP-centric application to the network using UDP. Thus, while some errors (e.g., some dropped packets) may occur, the number of errors is not high enough to cause significant problems with the service or application (e.g., significant voice or video pixilation, freezes, etc.).

If the current application or service that is being requested by the UE is a TCP-centric application, on the other hand, then the UDP threshold may not provide sufficient reliability. For TCP applications, therefore, a second, higher TCP threshold can be used. Thus, at 214, the method 200 can determine if the current network performance is above the TCP threshold. The TCP threshold can be chosen to be higher (less negative) than the UDP threshold and high enough that, even for those applications (e.g., large file downloads) that generally use TCP for reliability, UDP can be used reliably. The number is dependent on the carrier, the WBS, the UE, environmental conditions, etc. and can be different at different times and/or different traffic levels, among other things. In the example above, where the UDP threshold includes a minimum RSRP of −110 dBm, therefore, the TCP threshold can be set to something higher (less negative) such as, for example, −85 dBm (or some other level at which the error rate is very low).

In some examples, as above, the method 200 can also include an error checking algorithm. At 216, therefore, the method 200 can determine if the error rate using UDP is below an acceptable threshold. The threshold can be different for different applications and services, different UEs, different codecs, etc. If the error rate is determined to be below the error threshold for the service or application in use, then the method 200 can proceed to 212 and can continue to use the UDP connection for improved performance with reduced overhead. If, on the other hand, the error rate is above the error threshold, then the method 200 can proceed to 208 and can reconnect the UE to the network using TCP. This can enable the system to account for the error rate, whatever the cause, by employing the retransmission and error-checking functions inherent in TCP. As before, the method 200 can iteratively check the network conditions and error rates and switch back and forth between TCP and UDP as conditions allow.

Figure 3:
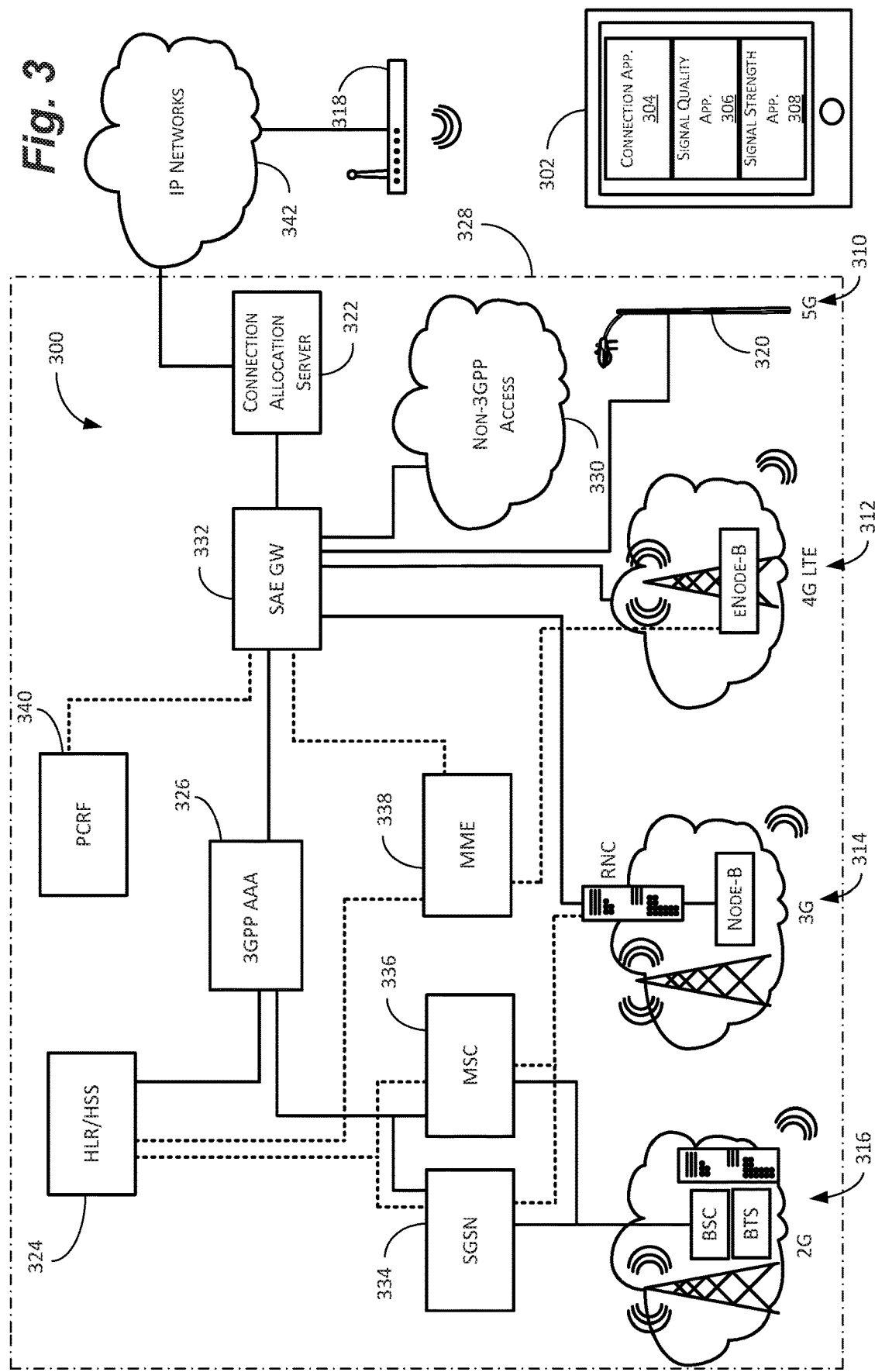
FIG. 3 is an example of a communications network for use with the methods disclosed herein, in accordance with some examples of the present disclosure.

FIG. 3 is an example of a system 300 for switching UE signaling between TCP and UDP as network and UE conditions change. The system 300 can include a plurality of UEs (though only one UE 302 is shown). In some examples, the UE 302 can also include one or more applications or modules for use with the methods 100, 200 described above. In some examples, the UE 302 can include one or more of a connection application 304, a signal quality application 306, and a signal strength application 308.

As the name implies, the signal quality application 306 can monitor the signal quality between the UE 302 and one or more network connections (e.g., Wi-Fi, 2G, 3G, 4G LTE, 5G etc.). The signal quality application 306 can use one or more known metrics for signal quality such as, for example, ECIO, RSRQ, and/or SINR. Similarly, the signal strength application 308 can use one or more known metrics for signal strength such as, for example, RSSI and/or reference signal received power (RSRP). The signal applications 306, 308 may be in direct communication with the transceiver(s) and/or the antenna(s) for this purpose, or can receive data via the processor(s) or other components of the UE 302 or the network 328.

The connection application 304, in turn, can receive information from the signal applications 306, 308, to determine whether to connect to the applicable network using UDP or TCP. As mentioned above, when network conditions are good, the UE 302 can connect to the network using UDP for improved efficiency. When conditions are below the predetermined threshold(s), the UE 302 can connect to the network using TCP for improved reliability. This can reduce problems associated with delayed connections, for example, and can reduce error rates in applications that otherwise would automatically use UDP regardless of network conditions. To this end, the connection application 304 can also receive data from the network such as, for example, network latency, jitter, and available bandwidth.

The system can also include 5G 310, 4G 312, 3G 314, and 2G 316 cellular connections as well as a WLAN 318 connection. As shown, while the 5G components 310 can be located on a traditional cell tower, in some cases, due to the relatively limited propagation and penetration distances of some 5G frequencies in comparison to other cellular frequencies, 5G microcells can be included in updated streetlights 320, for example, to provide additional coverage.

As also mentioned above, the methods 100, 200 can be managed from the network 328, from the UE 302, or a combination thereof. To this end, the system 300 can include a connection allocation server 322. As the name implies, the connection allocation server 322 can monitor network conditions from the network side, for example, and determine whether requests are handled using TCP or UDP. The connection allocation server 322 can be standalone, as shown, or can be included in one or more existing network entities (e.g., the home location register/home subscriber server (HLR/HSS) 324, discussed below).

FIG. 3 depicts a cellular network 328 including 2G 316, 3G 314, 4G LTE 312, and 5G 310 components. Of course, other current and even future technologies, such as, for example, internet of things (IoT) and device-to-device (D2D) components could also be included and are contemplated herein. As mentioned above, in some examples, the connection allocation server 322 can be standalone. In other examples, many of the "back-end" components of the network 328 can handle some, or all, of the allocation. Indeed, some, or all, of the aforementioned functions 304, 306, 308 and the connection allocation server 322 could be located on one or more of, for example, the HLR/HSS 324, a 3GPP authentication, authorization and accounting (AAA) server 326, or other components. In other words, some, or all, of the functions 304, 306, 308 and the connection allocation server 322 can be installed on the UE 302, can be standalone, or can be integrated into one of the existing network components.

As is known in the art, data can be routed from the Internet or other sources using a circuit switched modem connection (or non-3GPP connection) 330, which provides relatively low data rates, or via IP based packet switched connections, which results is higher bandwidth. The 4G 312 and 5G 310 networks, which are purely IP based, enable data to go straight from the Internet to the service architecture evolution gateway (SAE GW) 332 to evolved Node B transceivers, enabling higher throughput. Many UEs 302 also have wireless local area network (WLAN) 318 capabilities, in some cases enabling even higher throughput.

The serving GPRS support node (SGSN) 334 is a main component of the general packet radio service (GPRS) network, which handles all packet switched data within the cellular network 328—e.g. the mobility management and authentication of the users. The MSC 336 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 336 sets up and releases the end-to-end connection, handles mobility and hand-over requirements during the call, and takes care of billing and real time pre-paid account monitoring.

Similarly, the mobility management entity (MME) 338 is the key control-node for the 4G network 312. It is responsible for idle mode UE 302 paging and tagging procedures including retransmissions. The MME 338 is involved in the bearer activation/deactivation process and is also responsible for choosing the SAE GW 332 for the UE 302 at the initial attach and at time of intra-LTE handover involving core network (CN) node relocation (i.e., switching from one cell site to the next when traveling). The MME 338 is responsible for authenticating the user (by interacting with the HLR/HSS 324 discussed below). The non-access stratum (NAS) signaling terminates at the MME 338 and it is also responsible for generation and allocation of temporary identities to UE 302. The MME 338 also checks the authorization of the UE 302 to camp on the service provider's home public land mobile network (HPLMN) or visiting public land mobile network (VPLMN) and enforces UE 302 roaming restrictions on the VPLMN. The MME 338 is the termination point in the network for ciphering/integrity protection for NAS signaling and handles the security key management. The MME 338 also provides the control plane function for mobility between 4G 312 and 2G 316/3G 314 access networks with the S3 interface terminating at the MME 338 from the SGSN 334. The MME 338 also terminates the S6a interface towards the home HLR/HSS 324 for roaming UEs.

The HLR/HSS 324 is a central database that contains user-related and subscription-related information. The functions of the HLR/HSS 324 include functionalities such as mobility management, call and session establishment support, user authentication and access authorization. The HSS, which is used for LTE and 5G connections, is based on the previous HLR and authentication center (AuC) from CGMA and GSM technologies, with each serving substantially the same functions for their respective networks.

The policy and charging rules function (PCRF) 340 is a software node that determines policy rules in the cellular network 328. The PCRF 340 generally operates at the network core and accesses subscriber databases (e.g., the HLR/HSS 324) and other specialized functions, such as content handling (e.g., whether the user has sufficient data left in their plan), in a centralized manner. The PCRF 340 is the main part of the cellular network 328 that aggregates information to and from the cellular network 328 and other sources (e.g., IP networks 342). The PCRF 340 can support the creation of rules and then can automatically make policy decisions for each subscriber active on the cellular network 328. The PCRF 340 can also be integrated with different platforms like billing, rating, charging, and subscriber databases or can be deployed as a standalone entity.

Finally, the 3GPP AAA server 326 performs authentication, authorization, and accounting (AAA) functions and may also act as an AAA proxy server. For WLAN 318 access to (3GPP) IP networks 342 the 3GPP AAA server 326 provides authorization, policy enforcement, and routing information to various WLAN 318 components. The 3GPP AAA server 326 can generate and report billing/accounting information, perform offline billing control for the WLAN 318, and perform various protocol conversions when necessary.

In some examples, the HLR/HSS 324 and/or 3GPP AAA server 326 can contain some, or all, of the components of the system 300. The HLR/HSS 324 and/or 3GPP AAA server 326 can include, for example, the connection allocation server 322, applications 304, 306, 308, and other functions. Of course, as mentioned above, other components (e.g., the PCRF 340 or MME 338) could also include some, or all, of the system 300.

Figure 4:
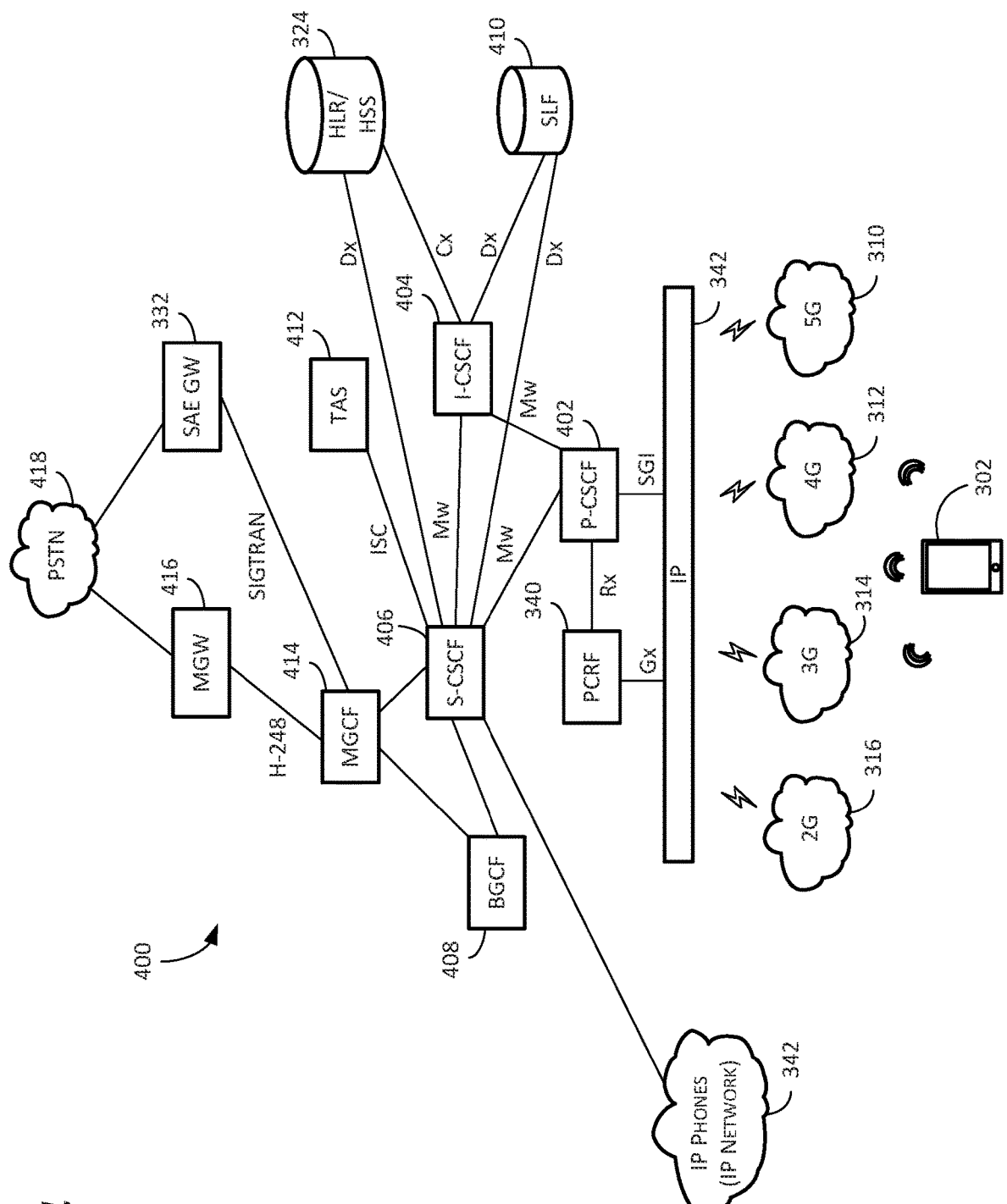
FIG. 4 is an example of an internet protocol multimedia subsystem (IMS) portion of the communications network for use with the methods disclosed herein, in accordance with some examples of the present disclosure.

FIG. 4 includes a more detailed view of the components of the IMS 400 for the 4G 312 and 5G 310 networks. As shown, the IMS 400 includes several network components for routing signals, storing subscriber information, and connecting across various subsystems and network types. The IMS 400 is built on SIP as the base to further support packaging of voice, video, data, fixed, and mobile services on a single platform to end users. It enables communications across multiple types of networks, including cellular, satellite, broadband, cable, fiber, and fixed networks, and enables the creation of efficient interoperating networks.

The IMS 400 also provides interoperability for the UE 302 and other devices across multiple platforms including, for example, 2G 316, 3G 314, 4G 312, 5G 310, and IP 342 networks. The IMS 400 also includes some components already discussed more generally in FIG. 3. These include, for example, the PCRF 340, HLR/HSS 324, and SAE GW 332.

The IMS 400 also includes the P-CSCF 402. The P-CSCF 402 is the entry point to the IMS 400 and serves as the outbound proxy server for the UE 302. The UE 302 attaches to the P-CSCF 402 prior to performing IMS registrations and initiating SIP sessions. The P-CSCF 402 may be in the home domain of the IMS operator, or it may be in the visiting domain, where the UE 302 is currently roaming. For attachment to a given P-CSCF 402, the UE 302 performs P-CSCF 402 discovery procedures. Attachment to the P-CSCF 402 enables the UE 302 to initiate registrations and sessions with the IMS 400.

The IMS 400 also includes an interrogating-call session control function (I-CSCF) 404. The I-CSCF 404 acts as an inbound SIP proxy server in the IMS 400. During IMS registrations, the I-CSCF 404 queries the HLR/HSS 324 to select the appropriate S-CSCF 406 (discussed below) which can serve the UE 302. During IMS 400 sessions, the I-CSCF 404 acts as the entry point to terminating session requests. The I-CSCF 404 routes the incoming session requests to the S-CSCF 406 of the called party.

The IMS 400 also includes the S-CSCF 406. The S-CSCF 406 acts as a registrar server, and in some cases, as a redirect server. The S-CSCF 406 facilitates the routing path for mobile-originated or mobile-terminated session requests. The S-CSCF 406 also interacts with various components for playing tones and announcements, among other things. The S-CSCF 406 can receive initial filter criteria (IFCs) from the HLR/HSS 324 and establish the appropriate sessions with telephony application servers (TASs) 412 according to the services included in the IFC.

The IMS 400 also includes a breakout gateway control function (BGCF) 408. The BGCF 408 is the IMS 400 element that selects the network in which PSTN 418 (discussed below) breakout is to occur. If the breakout is to occur in the same network as the BGCF 408, for example, then the BGCF 408 selects a media gateway control function (MGCF) 414 (also discussed below) that will be responsible for interworking with the PSTN 418. The MGCF 414 then receives the SIP signaling from the BGCF 408.

The IMS 400 also includes a subscriber location function (SLF) 410. The SLF 410 provides information about the HLR/HSS 324 that is associated with a particular user profile. It is generally implemented using a database. If the IMS 400 contains more than one HLR/HSS 324, then the I-CSCF 404 and S-CSCF 406 will communicate with the SLF 410 to locate the appropriate HLR/HSS 324 based on the user profile.

The IMS 400 also includes the aforementioned TAS 412. As the name implies, the TAS 412, sometimes known in a telephony-only context simply as an application server (AS), is a component used to provide telephony applications and additional multimedia functions. The TAS 412 can include any entity in a telephone network that carries out functions that are not directly related to the routing of messages through the network. Such functions can include, for example, in-network answering machines, automatic call forwarding, conference bridges and other types of applications. And, while shown in FIG. 4 as a single entity, multiple TASs 412 are generally used to provide multiple services. Based on the IFC provided to the S-CSCF 406, for example, the S-CSCF 406 can establish sessions with one or more TASs 412, one TAS 412 for each service in the IFC.

The IMS 400 also includes the MGCF 414. The MGCF 414 is a SIP endpoint that handles call control protocol conversion between SIP and ISDN user part (ISUP)/bearer-independent call control (BICC) and interfaces with the SAE GW 332 over stream control transmission protocol (SCTP). The MGCF 414 also controls the resources in a media gateway (MGW) 416 across an H.248 interface. The MGW 416 is a translation device or service that converts media streams between disparate telecommunications technologies such as POTS, SS7, next generation networks (2G 316, 3G 314, 4G 312, and 5G 310) or private branch exchange (PBX) systems.

Finally, the IMS 400 also includes a public switched telephone network (PSTN) 418. The PSTN 418 is the world's collection of interconnected voice-oriented public telephone networks, both commercial and government-owned. It's also referred to as the plain old telephone service (POTS). With respect to IP phones (on the IP network 342), for example, the PSTN 418 furnishes much of the Internet's long-distance infrastructure. Because internet service providers (ISPs) pay long-distance providers for access to their infrastructure and share the circuits among many users through packet-switching (discussed above), internet users avoid having to pay usage tolls to anyone other than their ISPs.

Figure 5:
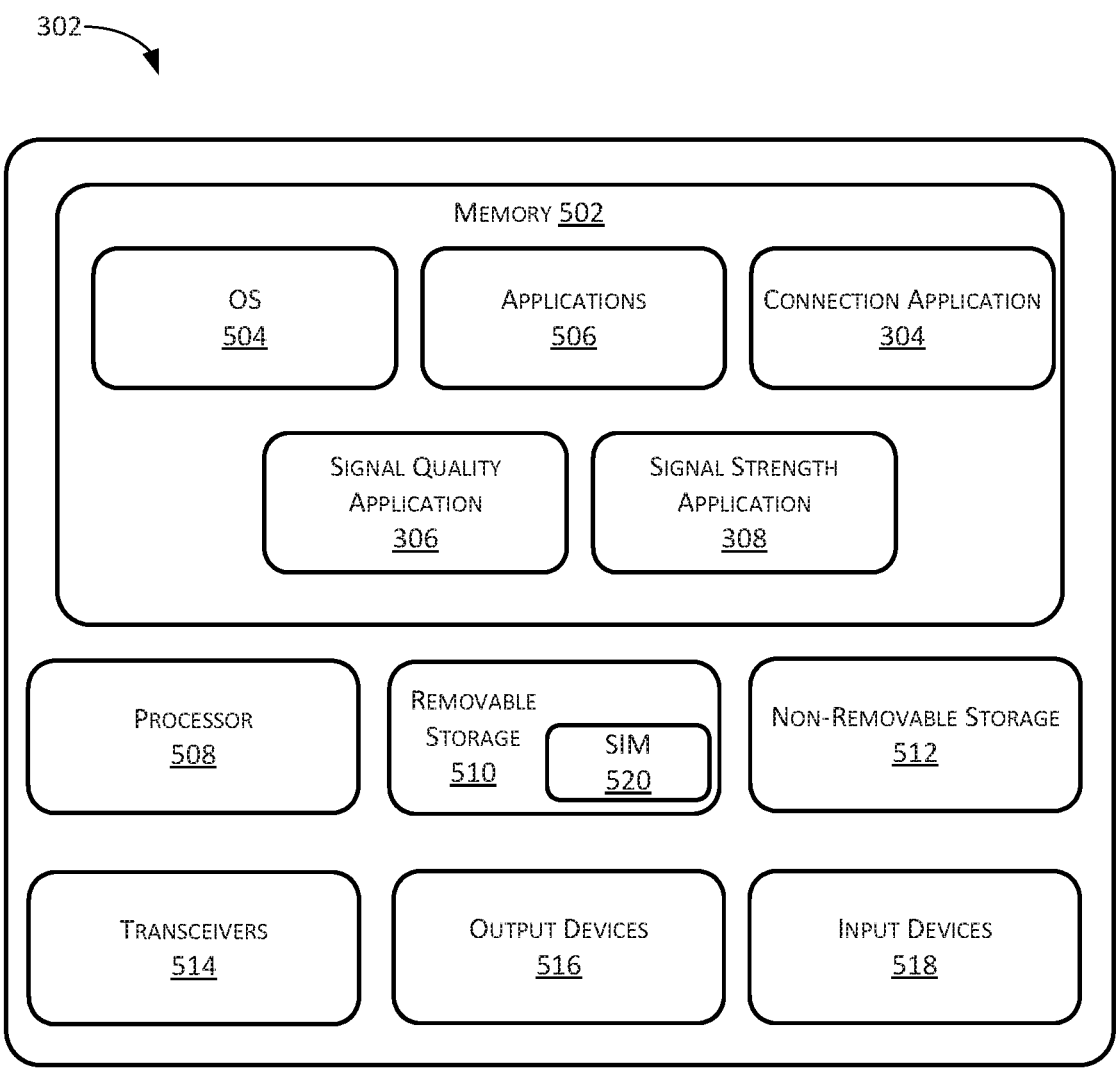
FIG. 5 is an example of a UE for use with the systems and methods disclosed herein, in accordance with some examples of the present disclosure.

FIG. 5 depicts a component level view of the UE 302 for use with the systems 300, 400 and methods 100, 200 described herein. For clarity, the UE 302 is described herein generally as a cell phone or smart phone. One of skill in the art will recognize, however, that the systems 300, 400 and methods 100, 200 described herein can also be used with a variety of other electronic devices, such as, for example, tablet computers, laptops, desktops, smartwatches, connected vehicles, and other network (e.g., cellular or IP network) connected devices. These devices are referred to collectively herein as the UE 302.

The UE 302 can comprise a number of components to execute the above-mentioned functions. As discussed below, the UE 302 can comprise memory 502 including an operating system 504 and common applications 506 such as, for example, contacts, calendar, call logs, voicemail, and e-mail, among other things. In some examples, the memory 502 can also include the connection application 304 and the signal applications 306, 308. The UE 302 can also comprise one or more processors 508, one or more of removable storage devices 510, non-removable storage devices 512, transceiver(s) 514, output device(s) 516, and input device(s) 518. In some examples, such as for cellular communication devices, the UE 302 can also include a subscriber identity module (SIM) 520. The SIM 520 can be a removable card inserted into a slot in the UE 302, for example, that enables the UE 302 to connect to the network and provides various information to the network such as the international mobile subscriber identity (IMSI). The SIM 520 can also be an embedded SIM (eSIM), which is generally a rewriteable chip installed on the main board of the UE 302 (e.g., an "eSIM"), that serves substantially the same purpose.

In various implementations, the memory 502 can be volatile (such as random access memory (RAM)), non-volatile (such as read only memory (ROM), flash memory, etc.), or some combination of the two. The memory 502 can include all, or part, of the functions 304, 306, 308, 506 and the OS 504 for the UE 302, among other things. In some examples, some or all of the functions 304, 306, 308, 506 and the OS 504 can be stored on the SIM 520 or on other removable storage.

The memory 502 can include the OS 504. Of course, the OS 504 varies depending on the manufacturer of the UE 302 and currently comprises, for example, iOS 11.2.6 for Apple products and Oreo for Android products. The OS 504 contains the modules and software that support a computer's basic functions, such as scheduling tasks, executing applications, and controlling peripherals. In some examples, the OS 504 can receive signals from the various components—e.g., the transceiver(s) 514 for signal strength measurements for the signal strength application 308—on the UE 302 to enable the connection application 304 to make various decisions, as discussed above. The OS 504 can also enable the UE 302 to send and retrieve data via an internet connection and perform other functions.

The UE 302 can also comprise one or more standard applications 506. The applications 506 can include those "factory" applications normally included with UEs. These can include, for example, e-mail applications for sending and receiving e-mail, contacts to store the user's contacts, calendar functions, web browsers, etc. The applications 506 can also include applications downloaded from the Internet, from an "app" store, or from other sources.

The UE 302 can also include the connection application 304, the signal quality application 306, and the signal strength application 308. The signal applications 306, 308 can receive data from the antenna(s), transceiver(s) 514, OS 504, and other sources to determine current signal conditions. The signal applications 306, 308 can then provide this data to the connection application 304, for example, which may combine this information with various network data (e.g., latency, jitter, bandwidth, etc.) to determine whether to use a UDP or TCP connection. The connection application 304 can also continue to monitor these inputs and can switch back and forth between UDP and TCP as conditions change. These changes may be due to changes in traffic volume, moving from one cell to another, changing atmospheric conditions, etc.

The UE 302 can also comprise one or more processors 508. In some implementations, the processor(s) 508 can be a central processing unit (CPU), a graphics processing unit (GPU), or both CPU and GPU, or any other sort of processing unit. The UE 302 may also include additional data storage devices (removable and/or non-removable) such as, for example, magnetic disks, optical disks, or tape. Such additional storage is illustrated in FIG. 5 by removable storage 510 and non-removable storage 512. The removable storage 510 and non-removable storage 512 can store some, or all, of the functions 304, 306, 308, 506 and/or OS 504.

Non-transitory computer-readable media may include volatile and nonvolatile, removable and non-removable tangible, physical media implemented in technology for storage of information, such as computer readable instructions, data structures, program modules, or other data. The memory 502, removable storage 510, and non-removable storage 512 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 302. Any such non-transitory computer-readable media may be part of the UE 302 or may be a separate database, databank, remote server, or cloud-based server.

In some implementations, the transceiver(s) 514 include any sort of transceivers known in the art. In some examples, the transceiver(s) 514 can include wireless modem(s) to facilitate wireless connectivity with the other UE, the Internet, and/or an intranet via the cellular network 328. Further, the transceiver(s) 514 may include a radio transceiver that performs the function of transmitting and receiving radio frequency communications via an antenna (e.g., Wi-Fi or Bluetooth®). In other examples, the transceiver(s) 514 may include wired communication components, such as a wired modem or Ethernet port, for communicating with other UEs or the provider's internet-based network. As mentioned above, the transceiver(s) 514 can also provide information related to signal strength and/or signal quality to enable the connection application 304 and the signal applications 306, 308 to perform the functions discussed above.

In some implementations, the output device(s) 516 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UE 302 is placing or receiving a call, connecting to the cellular network 328 via the 4G network 312 or the 5G network 310, or signaling using TCP or UDP. The output device(s) 516 can also play different sounds when receiving an incoming call or text message. The output device(s) 516 can also play sounds and/or display messages in response to the start of, or successful completion of, downloads. Output device(s) 516 also include ports for one or more peripheral devices, such as headphones, peripheral speakers, or a peripheral display.

In various implementations, input device(s) 518 include any sort of input devices known in the art. For example, the input device(s) 518 may include a camera, a microphone, a keyboard/keypad, or a touch-sensitive display. A keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. In some examples, the UE 302 can include a touchscreen, for example, to enable the user to make selections (e.g., from the applications 506) directly on the touchscreen.

In the case of cellular-connected UE, the UE 302 can also include the SIM 520. The SIM 520 can include various information about the user's account including, for example, an international mobile subscriber identity (IMSI). The IMSI, in turn, can include various information related to the country (mobile country code, or MCC) network provider (mobile network code, or MNC), and the mobile station international subscriber directory number (MSISDN). This information can be used by the cellular network 328 to determine whether the UE 302 is a home UE or a roaming UE and associate the UE 302 with a user's account. And, while shown as removable storage in FIG. 5, the SIM 520 can also include an integrated component such as, for example, an e-SIM.

Figure 6:
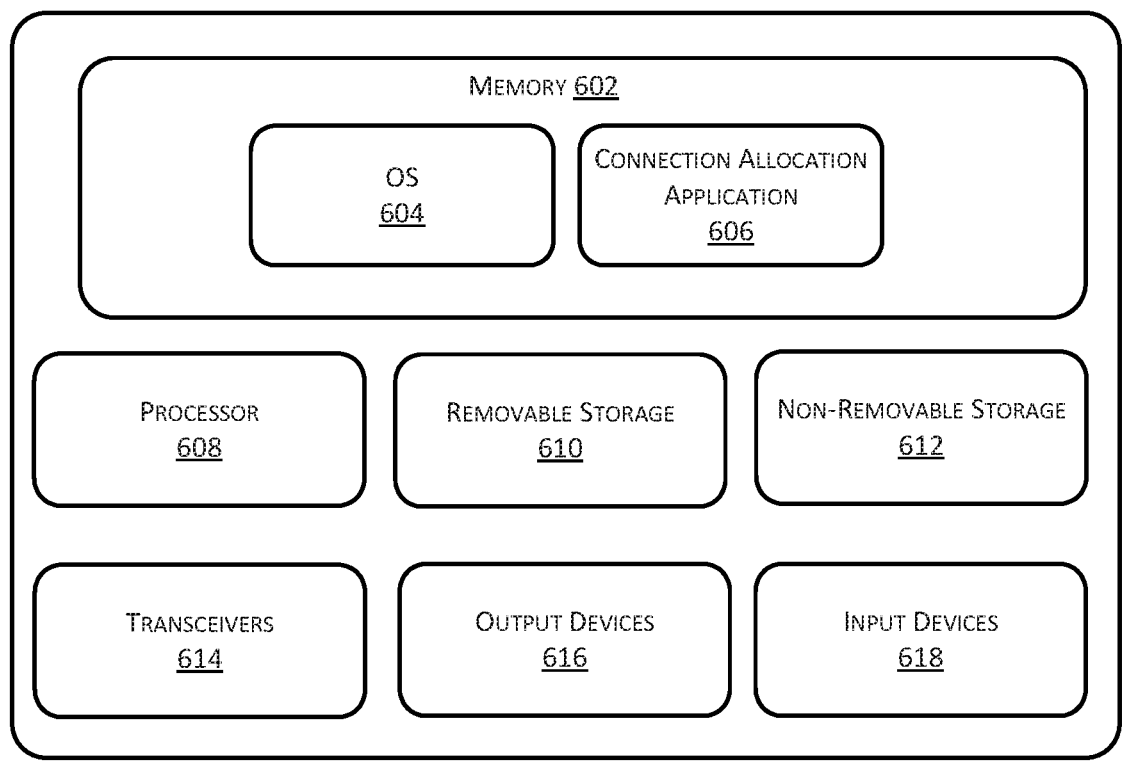
FIG. 6 is an example of a connection allocation server for use with the systems and methods disclosed herein, in accordance with some examples of the present disclosure.

As shown in FIG. 6, some, or all, of the functions associated with the systems 300, 400 and methods 100, 200 discussed above can be implemented by the connection allocation server 322. For clarity, the connection allocation server 322 is described herein as a standalone server. One of skill in the art will nonetheless recognize that the various components of the systems 300, 400 and methods 100, 200 described herein could be located in various other components of the cellular network. Thus, the connection allocation server 322 is intended only to simplify the discussion and not to limit the disclosure. The connection allocation server 322 can also be included as part of an existing network entity such as for example, the 3GPP AAA server 326, the P-CSCF 402, or the PCRF 340, or can be implemented on a cloud server, among other things.

The connection allocation server 322 can comprise a number of components to execute the above-mentioned functions and methods 100, 200. As discussed below, the connection allocation server 322 can comprise memory 602 including, for example, an OS 604 and a connection allocation application 606, among other things. In various implementations, the memory 602 can be volatile (such as RAM), non-volatile (such as ROM, flash memory, etc.), or some combination of the two. The memory 602 can also include the OS 604. Of course, the OS 604 varies depending on the manufacturer of the connection allocation server 322 and the type of component. Many servers, for example, run Linux or Windows Server. Dedicated cellular routing servers may run specific telecommunications OSs. The OS 604 contains the modules and software that supports a computer's basic functions, such as scheduling tasks, executing applications, and controlling peripherals.

In this case, the connection allocation server 322 can also include the connection allocation application 606. As discussed above with reference to FIGS. 1 and 2, the connection allocation application 606 can enable the connection allocation server 322 to perform the methods 100, 200 for controlling TCP/UDP allocation from the network side. Thus, the connection allocation server 322 can receive registration requests from the UE 302, monitor conditions on the network with both native data and data from the UE 302, and make connection (TCP/UDP) allocation decisions to reduce signaling overhead on the network, while maintaining acceptable reliability. Thus, the connection allocation server 322 may monitor traffic via the SAE GW 332 and other network entities to facilitate this flow optimization.

The connection allocation server 322 can also comprise one or more processors 608. In some implementations, the processor(s) 608 can be a central processing unit (CPU), a graphics processing unit (GPU), or both CPU and GPU, or any other sort of processing unit. The connection allocation server 322 can also include one or more of removable storage 610, non-removable storage 612, transceiver(s) 614, output device(s) 616, and input device(s) 618.

The connection allocation server 322 may also include additional data storage devices (removable and/or non-removable) such as, for example, magnetic disks, optical disks, or tape. Such additional storage is illustrated in FIG. 6 by removable storage 610 and non-removable storage 612. The removable storage 610 and non-removable storage 612 can store some, or all, of the OS 604 and the connection allocation application 606, among other things.

Non-transitory computer-readable media may include volatile and nonvolatile, removable and non-removable tangible, physical media implemented in technology for storage of information, such as computer readable instructions, data structures, program modules, or other data. The memory 602, removable storage 610, and non-removable storage 612 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the connection allocation server 322. Any such non-transitory computer-readable media may be part of the connection allocation server 322 or may be a separate database, databank, remote server, or cloud-based server.

In some implementations, the transceiver(s) 614 include any sort of transceivers known in the art. In some examples, the transceiver(s) 614 can include wireless modem(s) to facilitate wireless connectivity with the UE 302, the Internet, the cellular network 328, and/or an intranet via a cellular connection. Further, the transceiver(s) 614 may include a radio transceiver that performs the function of transmitting and receiving radio frequency communications via an antenna (e.g., Wi-Fi or Bluetooth®) to connect to the IP network 342. In other examples, the transceiver(s) 614 may include wired communication components, such as a wired modem or Ethernet port, for communicating with the UE 302, the SAE GW 332, or other entities in the cellular network 328 or IP network 342.

In some implementations, the output device(s) 616 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the connection allocation server 322 connects the UE 302 using TCP or UDP. Output device(s) 616 also include ports for one or more peripheral devices, such as headphones, peripheral speakers, or a peripheral display.

In various implementations, input device(s) 618 include any sort of input devices known in the art. For example, the input device(s) 618 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems and methods above are discussed with reference to use with cellular and IP communications, the systems and methods can be used with other types of wired and wireless communications. In addition, while various functions are discussed as being performed on the connection allocation server 322 and/or by the UE 302, other components could perform the same or similar functions without departing from the spirit of the invention. In addition, while the disclosure is primarily directed to making connections to networks using TCP and UDP, the system could obviously be used in a similar manner on other networks and with other protocols, including other future networks.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A user equipment (UE) comprising:
a user interface (UI) to receive inputs from a user;
a display;
a transceiver to send and receive wired transmissions, wireless transmissions, or both wired transmissions and wireless transmissions;
memory storing at least a connection application, a signal quality application, and a signal strength application; and
a processor in communication with at least the one or more transceivers and the memory, the memory including computer-executable instructions to cause the processor to:
receive, at the UI, input from a user to connect to an application from the UE;
determine, at the signal quality application, whether a signal quality between the UE and a network exceeds a first predetermined threshold;
determine a second predetermined threshold based at least in part on components associated with the UE;
determine, at the signal strength application, whether a signal strength between the UE and the network exceeds the second predetermined threshold; and either:
connect, at the connection application, the UE to the network using user datagram protocol (UDP) when the signal quality exceeds the first predetermined threshold and the signal strength exceeds the second predetermined threshold; or
connect, at the connection application, the UE to the network using transmission control protocol (TCP) when the signal quality does not exceed the first predetermined threshold or the signal strength does not exceed the second predetermined threshold.

2. The UE of claim 1, wherein the first predetermined threshold comprises a reference signal received quality (RSRQ) of between −5 dB to −10 dB.

3. The UE of claim 1, wherein the second predetermined threshold comprises a reference signal received power (RSRP) of between −116 dBm and −110 dBm.

4. The UE of claim 1, wherein the UE is connected to the network using UDP, the instructions further causing the processor to:
determine, at the signal quality application, that the signal quality has fallen below the first predetermined threshold; and
reconnect, at the connection application, the UE to the network using TCP.

5. The UE of claim 1, wherein the UE is connected to the network using UDP, the instructions further causing the processor to:
determine, at the signal strength application, that the signal strength has fallen below the second predetermined threshold; and
reconnect, at the connection application, the UE to the network using TCP.

6. The UE of claim 1, wherein the UE is connected to the network using UDP, the instructions further causing the processor to:
determine, at the processor, that an error rate for the application has exceeded a predetermined threshold; and
reconnect, at the connection application, the UE to the network using TCP.

7. The UE of claim 1, wherein the second predetermined threshold is based at least in part on a condition of a cellular wireless base station associated with the network.

8. A method comprising:
receiving, at a user interface (UI) of a user equipment (UE), a request to connect to an application on a network;
determining a user datagram protocol (UDP) threshold associated with the UE based at least in part on one or more components associated with the UE;
determining, at a processor of the UE, whether a network condition exceeds the UDP threshold; and either:
when the network condition does not exceed the UDP threshold, sending, at a transceiver of the UE, a request to connect to the network using transmission control protocol (TCP); or
when the network condition exceeds the UDP threshold,
determining, at the processor of the UE, whether the application is a UDP application or a TCP application, and
when the application is a UDP application, sending, at the transceiver of the UE, a request to connect to the network using UDP.

9. The method of claim 8, further comprising:
determining, at the processor, that the network condition has fallen below the UDP threshold; and
sending, at the transceiver of the UE, a second request to reconnect to the network using TCP.

10. The method of claim 8, further comprising:
determining, at the processor, that an error rate for the application is above a predetermined error rate; and
sending, at the transceiver of the UE, a second request to reconnect to the network using TCP.

11. The method of claim 8, further comprising:
When the application is a TCP application, determining, at the processor of the UE, whether the network condition exceeds a TCP threshold; and either:
sending, at the transceiver of the UE, a request to connect to the network using UDP when the network condition exceeds the TCP threshold; or
sending, at the transceiver of the UE, a request to connect to the network using TCP when the network condition does not exceed the TCP threshold;
wherein the TCP threshold is higher than the UDP threshold.

12. The method of claim 11, wherein the network condition exceeds the TCP threshold, the method further comprising:
determining, at the processor, that the network condition has fallen below the TCP threshold; and
sending, at the transceiver of the UE, a second request to reconnect to the network using TCP.

13. The method of claim 11, wherein the network condition exceeds the TCP threshold, the method further comprising:

determining, at the processor, that an error rate for the application is above a predetermined error rate; and sending, at the transceiver of the UE, a second request to reconnect to the network using TCP.

14. The method of claim 11, wherein the UDP threshold comprises a reference signal received power (RSRP) of at least −110 dBm; and wherein the TCP threshold comprises an RSRP of at least −85 dBm.

15. A method comprising:

receiving, at a network entity, a request to connect to an application from a user equipment (UE);

determining, at the network entity, a predetermined threshold associated with the UE based at least in part on a condition associated with the network entity;

determining, at the network entity, whether a network condition exceeds the predetermined threshold;

determining, at the network entity, based at least in part on the request, whether the request exceeds a maximum transmission unit (MTU); and either:

connecting the UE to a network using user datagram protocol (UDP) when the network condition exceeds the predetermined threshold and the request does not exceed the MTU; or connecting the UE to the network using transmission control protocol (TCP) when at least one of the network condition does not exceed the predetermined threshold or the request exceeds the MTU.

16. The method of claim 15, wherein the network condition comprises a signal strength between the UE and the network.

17. The method of claim 16, wherein the predetermined threshold comprises a reference signal received power (RSRP) of between −116 dBm and −110 dBm.

18. The method of claim 15, wherein the network condition comprises a signal quality between the UE and the network.

19. The method of claim 18, wherein the predetermined threshold comprises a reference signal received quality (RSRQ) of between −5 dB and −10 dB.

20. The method of claim 15, wherein the UE is connected to the network using UDP, the method further comprising:

determining, at the network entity, that the network condition has fallen below the predetermined threshold; and reconnecting the UE to the network using TCP.

* * * * *